US007939581B2

(12) United States Patent
Moloney et al.

(10) Patent No.: US 7,939,581 B2
(45) Date of Patent: May 10, 2011

(54) SURFACE FUNCTIONALISATION USING ARYLCARBENE REACTIVE INTERMEDIATES

(75) Inventors: Mark Moloney, Oxford (GB); Jon-Paul Griffiths, Oxford (GB)

(73) Assignee: Isis Innovation Limited, Oxford (GB)

( * ) Notice: Subject to any disclaimer, the term of this patent is extended or adjusted under 35 U.S.C. 154(b) by 793 days.

(21) Appl. No.: 11/795,253

(22) PCT Filed: Jan. 17, 2006

(86) PCT No.: PCT/GB2006/000139

§ 371 (c)(1),
(2), (4) Date: Sep. 4, 2007

(87) PCT Pub. No.: WO2006/075183

PCT Pub. Date: Jul. 20, 2006

(65) Prior Publication Data

US 2008/0146731 A1   Jun. 19, 2008

(30) Foreign Application Priority Data

Jan. 17, 2005   (GB) .................................. 0500895.8

(51) Int. Cl.
*C09D 5/16* (2006.01)
(52) U.S. Cl. ...................... 523/122; 427/372.2; 528/492
(58) Field of Classification Search .................. 523/122; 427/372.2; 528/492
See application file for complete search history.

(56) References Cited

U.S. PATENT DOCUMENTS

| 5,490,983 | A | 2/1996 | Worley et al. |
| 6,060,046 | A | 5/2000 | Steinberg et al. |
| 6,110,936 | A | 8/2000 | Gravestock |
| 6,699,527 | B1 | 3/2004 | Moloney et al. |
| 2004/0127691 | A1 | 7/2004 | Moloney et al. |

FOREIGN PATENT DOCUMENTS

| FR | 1 500 512 | 11/1967 |
| GB | 2 013 201 A | 8/1979 |
| WO | WO 95/19949 | 7/1995 |
| WO | WO 96/01294 | 1/1996 |
| WO | WO 99/01514 | 1/1999 |
| WO | 00/26180 | 5/2000 |
| WO | WO 00/26180 | 5/2000 |

OTHER PUBLICATIONS

International Search Report dated Sep. 14, 2006.
Written Opinion.
D. R. Braybrook et al., J. Photochem. Photobid A: Chem, 1993, 70, 171.
D.D. Tanner et al., J. Org.Chem., 1980, 45, 5177.
S. Hünig et al., Eur. J. Org. Chem., 2002, 10, 1603-1613.
Reactive Functional Polymers, 2000, 45, 137-144.
D. Davies, Nature, 2003, 2, 114.
H.C. Tiller et al., PNAS, 2001, 98, 5981.
M. W. Eknoian and S. D. Worley, *Journal of Bioactive and Compatible Polymers*, 1998, 13, 303.
D. B. Elrod and S. D. Worley, *Journal of Bioactive and Compatible Polymers*, 1999, 14, 258.
G. Sun, L. C. Allen, E. P. Luckie, W. B. Wheatley, and S. D. Worley, *Industrial & Engineering Chemistry Research*, 1995, 34, 4106.
S. D. Worley and G. Sun, *Trends in Polymer Science*, 1996, 4, 364.
Y. Makioka, S.-Y Uebori, M. Tsuno, Y. Taniguchi, K. Takaki, and Y. Fujiwara, *J. Org.Chem.*, 1996, 61, 372.
G. Sun and X. Xu, *Textile Chemist and Colorist*, 1998, 30, 26.
G. Sun and J.F. Williams, *Chemistry & Industry*, 1999, 658.
G. Sun and X. Xu, *Textile Chemist and Colorist*, 1999, 31, 31.
S. V. Sunthankar, R. Gopalan, and A. B. Vayla, *Ind. J. Chem.*, 1973, 11, 503.
*Journal of Environmental Health*, 1998, 60, 47.
H. Carlsohn, U. C. Hipler, A. Breuer, A. Schutz, H. Schutz, and M. Hartmann, *Pharmazie*, 1983, 38, 823.
Ciba-Geigy, in 'Microbiocidally Active Acylated Furanones', GB2013201, 1979.
J. Hazzizalaskar, N. Nurdin, G. Helary, and G. Sauvet, *Journal of Applied Polymer Science*, 1993, 50, 651.
J. Hazzizalaskar, G. Helary, and G. Sauvet, *Journal of Applied Polymer Science*, 1995, 58, 77.
J. Kizlink, A. Fargasova, and L. Reinprecht, *Drevarsky Vyskum*, 1996, 41, 19.
N. Nurdin, G. Helary, and G. Sauvet, *Journal of Applied Polymer Science*, 1993, 50, 663.
N. Nurdin, G. Helary, and G. Sauvet, *Journal of Applied Polymer Science*, 1993, 50, 671.
G. Sauvet, S. Dupond, K. Kazmierski, and J. Chojnowski, *Journal of Applied Polymer Science*, 2000, 75, 1005.
G. N. Tew, D. Lui, B. Chen, R. J. Doerksen, J. Kaplan, P. J. Carroll, M. L. Klein, and W. F. D. Grado, *PNAS*, 2002, 99, 5110.

*Primary Examiner* — Edward J Cain
(74) *Attorney, Agent, or Firm* — Nixon & Vanderhye P.C.

(57) ABSTRACT

A process for producing a substrate having a functionalised surface, which process comprises contacting the substrate with a carbene precursor, which carbene precursor is a compound of formula (III) or (IV) whose substituent groups are defined herein: (b) generating a carbene reactive intermediate from the carbene precursor so that it reacts with the substrate to functionalise the surface, thereby yielding an activated substrate; and (c) further functionalising the activated substrate obtained in (b). In (c), the activated substrate may be further functionalised by treating the activated substrate with a diazonium salt for the introduction of colour and/or another desired activity, and/or by treatment with hydrogen peroxide to produce a biocidal substrate. The invention further relates to carbene precursor compounds for use in the surface functionalisation process, and to processes for preparing certain precursor compounds.

24 Claims, No Drawings

SURFACE FUNCTIONALISATION USING ARYLCARBENE REACTIVE INTERMEDIATES

This application is the U.S. national phase of International Application No. PCT/GB2006/000139 filed 17 Jan. 2006 which designated the U.S. and claims priority to GB 0500895.8 filed 17 Jan. 2005, the entire contents of each of which are hereby incorporated by reference.

The present invention relates to a process for the surface functionalisation of a substrate using an arylcarbene as the reactive intermediate. The invention in particular relates to a process for the surface functionalisation of a polymeric or an inorganic substrate for producing a substrate which is coloured and/or which has biocidal activity. The process of the invention can be used to produce biocidal substrates in which the biocidal activity is regenerable. The invention further relates to carbene precursor compounds for use in the surface functionalisation process, and to processes for preparing certain precursor compounds.

Dyestuffs which are used to colour natural and synthetic polymers, via covalent modification, most commonly rely upon the presence of highly reactive groups which have been coupled to the chromophoric species. Examples include the Procion and Gibacron range of dyes (which rely upon the reactivity of a chlorotriazinyl residue with nucleophilic residues on the substrate) and the Remazol range of dyes (which rely on a vinylsulfonyl residue as a nucleophilic acceptor for appropriate reactive groups on the polymer). Both of these reactive classes of dye have preferred substrates, which must possess the required nucleophilic characteristics. Development of this type of strategy still continues. However, in addition to the requirement for nucleophilic functionality on the substrate (usually hydroxyl or amino groups), this approach generally requires vigorous conditions, such as high temperature or strongly basic media, for bond formation to occur.

An alternative technique whereby highly reactive carbene or nitrene species are generated from inert precursors under less harsh conditions has also been investigated for application to dyeing and other surface modifying processes of various natural and synthetic polymers. The chemistry of carbenes and nitrenes is well documented, and these reactive entities are known to form covalent bonds with many types of functional group. The application of these species to the surface modification of organic solids using different approaches both for the generation of the required carbenes or nitrenes, and for their reaction with the solid surface has been reported.

French Patent No. 1 500 512 describes allowing carbenes to come into contact with an organic solid. The preferred method for surface modification is to allow the volatilised carbene to come into contact with the polymer. Inherent in this approach, however, are limitations: only volatile (i.e. low molecular weight) carbenes, and those stable to relatively high temperatures, are applicable.

The application of carbenes generated from diazo compounds as suitable reactive dyes has been found to have important limitations, for example the ease of generation of the required diazo precursor (D. R. Braybrook et al., *J. Photochem. Photobiol A: Chem*, 1993, 70, 171) and the stability of the dye to the carbene generating process.

More recently, the use of carbenes carrying pendant activated side chains for colouration is described in WO 00/26180.

The rapid rise of Methicillin Resistant *Staphylococcus Aureus* ("Golden Staph") and other resistant bacteria has led to a significant increase in persistent bacterial infections in the human population world-wide. This has proved to be a major problem in surgery, particularly where post-operative recovery is complicated by infections acquired within the hospital environment. The problem of bacterial infection is not restricted solely to medical applications, though, and increasing pressure is being brought to bear on industry to control the spread of bacterial infection. Within the European Union, for instance, the European Biocidal Products Directive (98/9/EC) establishes a duty of care by European industries wherever possible to use antibacterial agents to protect the general population against harmful bacteria.

The potential of halogenated furanones and isothiazolones in antifouling polymers has been described in WO 99/01514. In this work, an organic antifouling agent was mixed with an extrudable polymer and examined for antifouling properties. However, limitations of this technology are that it relies on bulk dispersion of an expensive biocidal agent, it is restricted to a narrow range of polymers, and the polymer cannot be "reprimed".

These limitations have been addressed to some extent by covalent attachment of the furanone; for instance, the use of plasma activation with a small sample of polymer types is described in WO 96/01294, where biological efficacy is demonstrated.

Alternative strategies have been based on regenerable biocidal polymers. For example, U.S. Pat. No. 5,490,983 relates to immobilised N-halamines for disinfectant use. The disinfectant properties of these compounds in solution has been known for many years, for instance in water purification and fabrics. The formulations of U.S. Pat. No. 5,490,983 involve immobilisation of the biocidal agent in polymeric form, and the biocidal activity of the polymers is in principle regenerable. However, one intrinsic problem is that the regeneration technique requires chlorine. This is a toxic gas, and strenuous efforts to minimise the use of this compound are being made across all industry. The technique of U.S. Pat. No. 5,490,983 is therefore of inherently restricted applicability.

Limitations to existing technologies for controlling the growth and spread of bacteria and for introducing colour into a polymeric substrate, including those mentioned above, include the use of toxic reagents and lengthy synthetic procedures, the reliance on bulk dispersion of an expensive biocidal agent, restriction to a narrow range of polymers, that the biocidal activity cannot be "reprimed" since leakage of the biocidal agent leads to loss of activity, and a limited applicability in terms of the range and forms of polymeric substrate that can be functionalised. The present invention aims to address these issues.

Accordingly, the present invention provides a process for producing a substrate having a functionalised surface, which process comprises:

(a) contacting the substrate with a carbene precursor, which carbene precursor is selected from a compound of the following formula (III):

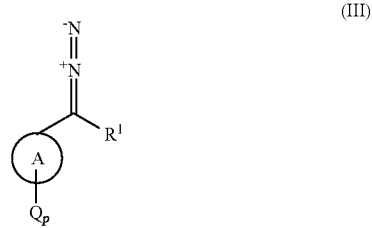

wherein
A is an aryl or heteroaryl ring;
p is 1, 2, 3, 4 or 5;
$R^1$ is selected from hydrogen, aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by N($R^2$), O or S wherein $R^2$ is H or $C_1$-$C_6$ alkyl;

Q is selected from —N($Z_1$)($Z_2$) and —$CH_2$—V—(W—R)$_n$;

$Z_1$ and $Z_2$ are independently selected from aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by N($R^2$), O or S wherein $R^2$ is H or $C_1$-$C_6$ alkyl;

V is -alk-, —O-alk—, -alk-O— or —O-alk—O—, wherein alk is $C_1$-$C_{10}$ alkylene;

W is a functional group of one of the following formulae (a) to (c):

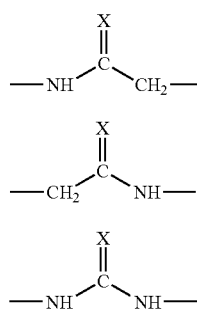

wherein X is O, S or $NH_2^+$; and
R is selected from H, $C_1$-$C_6$ alkyl which is unsubstituted or substituted, aryl which is unsubstituted or substituted and heteroaryl which is unsubstituted or substituted;
and n is 1, 2 or 3;
and a compound of the following formula (IV):

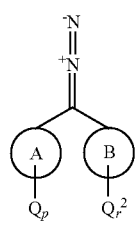

wherein each of A and B, which are the same or different, is an aryl or heteroaryl ring;
each of Q and $Q^2$, which are the same or different, is —N($Z_1$)($Z_2$) or —$CH_2$—V—(W—R)$_n$, wherein $Z_1$, $Z_2$, V, W, R and n are as defined above for formula (III); and each of p and r, which are the same or different, is 1, 2, 3, 4 or 5;

(b) generating a carbene reactive intermediate from the carbene precursor so that it reacts with the substrate to functionalise the surface, thereby yielding an activated substrate; and
(c) further functionalising the activated substrate obtained in (b).

In step (c) of the process of the invention as defined above the activated substrate obtained in step (b) is further functionalised. By "functionalise" as used in this context is meant the introduction of a, or of another, chemical functional group which exhibits desirable physical or chemical properties, by covalent attachment or by attachment through hydrogen bonding.

The activated substrate may be further functionalised by treating the activated substrate with a diazonium salt. Additionally or alternatively, the activated substrate may be further functionalised by treating the activated substrate with hydrogen peroxide, preferably aqueous hydrogen peroxide.

Typically, for the introduction of colour, step (c) involves treating the activated substrate obtained in step (b) with a diazonium salt, thereby forming a diazo coupled coloured substrate. The diazonium salt may be selected such that the desired colour is obtained, for instance cyan, magenta, yellow, black, red, green, blue or orange. Typically, the diazonium salt is of type $ArN_2^+$, wherein Ar is substituted or unsubstituted aryl or substituted or unsubstituted heteroaryl, wherein the aryl or heteroaryl ring may be substituted or unsubstituted at any or all positions of the Ar group. Typically Ar is substituted or unsubstituted phenyl. Examples include fast black K salt [2,5-dimethoxy-4-((4-nitrophenyl)diazenyl) benzenediazonium chloride] or 4-N,N-dimethylaminobenzene diazonium chloride.

Alternatively, the activated substrate obtained in step (b) may be treated with a diazonium salt which is itself functionalised to confer a desired activity on the substrate. Thus, for, the introduction of a particular desired activity, step (c) may involve treating the activated substrate in step (b) with a functionalised diazonium salt, the functionality of which confers the desired activity. The desired activity may be a particular hydrophobicity or hydrophilicity, for example.

For the introduction of biocidal activity, step (c) of the process as defined above involves treating the activated substrate obtained in step (b) with hydrogen peroxide, to yield a biocidal polymeric substrate.

The activated substrate obtained in step (b) may be treated with both a diazonium salt and hydrogen peroxide. Thus, for the introduction of colour and biocidal activity step (c) of the process of the invention as defined above may comprise: (d) treating the activated substrate obtained in step (b) with a diazonium salt, thereby forming a diazo coupled coloured substrate, and (e) treating the diazo coupled coloured substrate obtained in step (d) with hydrogen peroxide.

Alternatively, for the introduction of biocidal activity and a further desired activity, step (c) of the process of the invention as defined above may comprise: (d') treating the activated substrate obtained in step (b) with a functionalised diazonium salt, whose functionality confers the desired activity, and (e') treating the diazo coupled substrate obtained in (c) with hydrogen peroxide.

Typically, when Q of formula (IV) is —N($Z_1$)($Z_2$), then $Q^2$ is also —N($Z_1$)($Z_2$), wherein $Z_1$ is as defined above and may be the same or different for Q and $Q^2$, and wherein $Z_2$ is as defined above and may be the same or different for Q and $Q^2$.

Typically, when Q of formula (IV) is —CH$_2$—V—(W—R)$_n$, then Q$^2$ is also —CH$_2$—V—(W—R)$_n$ wherein V, W, R and n are as defined above and may be the same or different for Q and Q$^2$.

Typically, Q of formula (III) is —N(Z$_1$)(Z$_2$), and Q and Q$^2$ of formula (IV) are both —N(Z$_1$)(Z$_2$), wherein Z$_1$ is as defined above and may be the same or different for Q and Q$^2$, and wherein Z$_2$ is as defined above and may be the same or different for Q and Q$^2$.

Typically, Z$_1$ is C$_1$-C$_4$ alkyl. Typically, Z$_2$ is C$_1$-C$_4$ alkyl. Z$_1$ and Z$_2$ may be the same C$_1$-C$_4$ alkyl. Typically, p is 1. Typically, r is 1.

In one embodiment, Q of formula (III) and Q and Q$^2$ of formula (IV) are both —CH$_2$—V—(W—R)$_n$, wherein V, W, R and n are as defined above and may be the same or different for Q and Q$^2$. Typically V is —O-alk—, wherein alk is C$_1$-C$_{10}$ alkylene. Typically W is a functional group of formula (c). Typically R is substituted or unsubstituted phenyl. Typically n is 1.

Typically A is phenyl. Typically B is phenyl.

In one embodiment, the present invention provides a process for producing a biocidal polymeric substrate, which process comprises:

(a) contacting the substrate with a diaryl carbene precursor, which precursor is selected from:
a compound of the following formula (I):

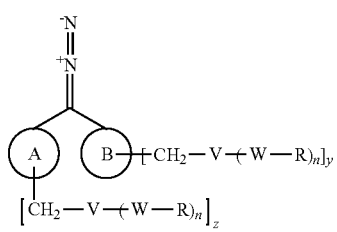

wherein
each of A and B, which are the same or different, is an aryl or heteroaryl ring;
n is an integer of 1 to 3;
y is 0 or an integer of 1 to 5;
z is 0 or an integer of 1 to 5;
provided that y and z are not both 0;
V is -alk, —O-alk—, -alk—O— or -alk—O—, wherein alk is C$_1$-C$_{10}$ alkylene;
W is a functional group of one of the following formulae (a) to (c):

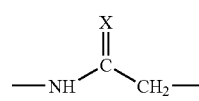

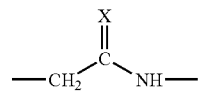

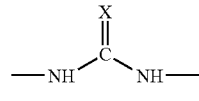

wherein X is O, S or NH$_2^+$; and
R is selected from H, C$_1$-C$_6$ alkyl which is unsubstituted or substituted, aryl which is unsubstituted or substituted and heteroaryl which is unsubstituted or substituted; and
a compound of formula (II):

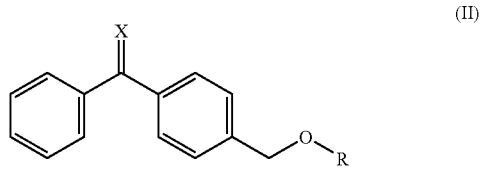

wherein
R is (CH$_2$)$_m$N(R$^3$)(R$^4$),
R$^3$ is C$_1$-C$_4$ alkyl,
R$^4$ is phenyl,
m is an integer of 1 to 4; and
X is N$_2$, (b) generating a carbene reactive intermediate from the diarylcarbene precursor so that it reacts with the substrate to functionalise the surface, thereby yielding an activated substrate; and (c) treating the activated substrate obtained in step (b) with aqueous hydrogen peroxide to yield a biocidal polymeric substrate. Typically in this embodiment the diaryl carbene precursor is a compound of formula (I). Typically y is an integer of 1 to 5 and z is an integer of 1 to 5.

The process of the invention offers significant economic and technical bulk advantages in that only the surface of the polymer is modified, and it is applicable to a diverse range of substrates including but not limited to natural and synthetic polymers and inorganic solids. The colouration of the diazo-coupled coloured substrates does not suffer from leaching, and the biocidal activity of the biocidal substrates is regenerable, that is, the polymer can be reactivated multiple times by treatment with a hydroperoxide solution.

The basic technique for functionalising the surface of a substrate using diarylcarbene precursors is described in WO 00/26180. That disclosure is concerned primarily with the surface functionalisation of a variety of polymeric substrates in order to colour the substrate.

The process of the present invention converts otherwise inert substrates, such as polymers, into activated substrates which possess surface functionality that allows the binding of a biocidal agent by addition of hydrogen peroxide or the addition of a functional group, such as a chromophoric group, by the addition of a diazonium salt. In the context of this invention, the biocidal activity is regenerable by subsequent retreatment of the activated substrate with fresh hydrogen peroxide. The fact that the functionality is confined to the surface of the substrate is advantageous because the bulk of the polymer is effectively sealed in and therefore the bulk properties of the polymer, including mechanical strength, remain unaffected by the biocidal, colour or other properties that are imparted to the surface.

The substrate treated in accordance with the present invention may be any natural or synthetic substrate which is capable of reaction with a carbene reactive intermediate generated from a diarylcarbene precursor of formula (III) or (IV) as defined above. The substrate is typically a natural or synthetic polymer including but not limited to cellulose, polyglycoside, polypeptide polyacrylates, polyacrylics, polyamides, polycarbonates, polyesters, polyethers, polyketones, polyolefins, rubbers, polystyrenics, polysulfones, polyurethanes, polyvinyls and their co-polymers; or an inorganic material including but not limited to silica, alumina, titania, glasses, and allotropes of carbon such as diamond, diamond-like carbon, graphite, fullerenes and nanotubes.

Where the substrate comprises a polymer, the molecular weight of the polymeric substrate may be selected according to the particular utility of the end product. For example, where the polymeric substrate treated in accordance with the present invention has biocidal properties, the molecular weight of the polymeric substrate may be selected according to the particular utility of the biocidal end product. In one embodiment, the substrate is selected from homopolymers and copolymers of ethylene or propylene, polyesters, polyamides, polystyrene, polytetrafluoroethylene, nylon, silica, cotton, silk and wool. In one embodiment of the invention the polymeric substrate is in a form that has a high surface area, for instance a powder or beads.

The polymer may be a homopolymer or a copolymer, for instance a block copolymer. It may thus be derived from monomeric units which are the same or different.

The polymer may be modified, for instance by admixture with an inorganic material. The substrate may thus comprise both a polymer and an inorganic material, for instance a mixture of a polymer and an inorganic material such as an inorganic filler. The substrate may, for example, comprise a mixture of one or more of the polymers referred to above and one or more of the inorganic materials referred to above. Modified polymers of this type are suitable for use in, for instance, semiconductor applications. Technical problems can arise when polymers are used as coating or bonding agents with semiconductors, owing to their different behaviour on heating. The inclusion of an inorganic filler with a polymer serves to modify the thermal properties of the polymer and make it better suited for use together with a semiconductor.

The diarylcarbene precursors of formula (I) are novel compounds. The present invention therefore further provides a compound of formula (I):

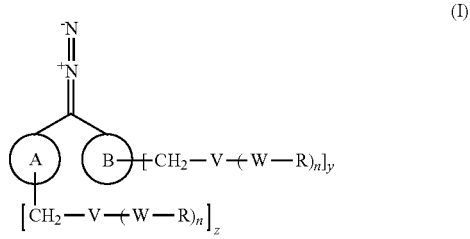

(I)

wherein
each of A and B, which are the same or different, is an aryl or heteroaryl ring;
n is an integer of 1 to 3;
y is 0 or an integer of 1 to 5;
z is 0 or an integer of 1 to 5;
provided that z and y are not both 0;
V is -alk, —O-alk—, -alk—O— or —O-alk—O—, wherein alk is $C_1$-$C_{10}$ alkylene;
W is a functional group of one of the following formulae (a) to (c):

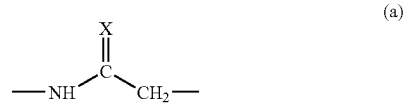

(a)

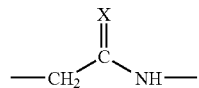

(b)

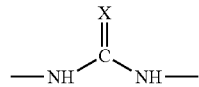

(c)

wherein X is O, S or $NH_2^+$; and
R is selected from H, $C_1$-$C_6$ alkyl which is unsubstituted or substituted, aryl which is unsubstituted or substituted, and heteroaryl which is unsubstituted or substituted; provided that the compound is not 4,4'-bis(N-acetyl-2-aminoethyl)diphenyldiazomethane.

Typically, z and y are not both 1.

In one embodiment of formula (I), y is an integer of 1 to 5 and z is an integer of 1 to 5.

A $C_1$-$C_{10}$ alkyl group is an unsubstituted or substituted, straight or branched chain saturated hydrocarbon radical. Typically it is $C_1$-$C_6$ alkyl, for example methyl, ethyl, propyl, butyl, pentyl or hexyl, or $C_1$-$C_4$ alkyl, for example methyl, ethyl, i-propyl, n-propyl, t-butyl, s-butyl or n-butyl. When an alkyl group is substituted it typically bears one or more substituents selected from $C_1$-$C_6$ alkyl which is unsubstituted, aryl, cyano, amino, $C_1$-$C_{10}$ alkylamino, di($C_1$-$C_{10}$)alkylamino, amido, hydroxy, halo, carboxy, $C_1$-$C_6$ alkoxy, haloalkyl, sulfonic acid, sulfhydryl (i.e. thiol, —SH), $C_1$-$C_{10}$ thioether and sulfonyl. Examples of substituted alkyl groups include haloalkyl, hydroxyalkyl, aminoalkyl and alkoxyalkyl groups.

An aryl group is a substituted or unsubstituted, monocyclic or bicyclic aromatic group which typically contains from 6 to 14 carbon atoms, preferably from 6 to 10 carbon atoms in the ring portion. Examples include phenyl, naphthyl, indenyl and indanyl groups. An aryl group is unsubstituted or substituted. When an aryl group as defined above is substituted it typically bears one or more substituents selected from $C_1$-$C_6$ alkyl which is unsubstituted, aryl which is unsubstituted, cyano, amino, amido, hydroxy, halo, carboxy, $C_1$-$C_6$ alkoxy, haloalkyl, sulfonic acid and sulfonyl. Typically it carries 0, 1, 2 or 3 substituents.

An alkylene group is unsubstituted or substituted, straight or branched chain saturated divalent hydrocarbon group. Typically it is $C_1$-$C_8$ alkylene, for instance $C_1$-$C_6$ alkylene. Preferably it is $C_1$-$C_4$ alkylene, for example methylene, ethylene, i-propylene, n-propylene, t-butylene, s-butylene or n-butylene. It may also be pentylene, hexylene, heptylene, octylene and the various branched chain isomers thereof A heteroaryl group is typically a 5- to 10 membered mono- or bicyclic heteroaromatic ring. It is generally a 5- or 6-membered ring, containing at least one heteroatom selected from O, S, N, P, Se and Si. It may contain, for example, 1, 2 or 3 heteroatoms. Examples of heteroaryl groups include pyridyl, pyrazinyl, pyrimidinyl, pyridazinyl, furanyl, thienyl, pyrazolidinyl, pyrrolyl, oxazolyl, oxadiazolyl, isoxazolyl, thiadiazolyl, thiazolyl, isothiazolyl, imidazolyl, pyrazolyl, quinolyl and isoquinolyl. A heteroaryl group may be unsubstituted or substituted, for instance, as specified above for alkyl. Typically it carries 0, 1, 2 or 3 substituents.

As used herein the term amino represents a group of formula —$NH_2$. The term $C_1$-$C_{10}$ alkylamino represents a group of formula —NHR' wherein R' is a $C_1$-$C_{10}$ alkyl group, preferably a $C_1$-$C_6$ alkyl group, as defined previously. The term di($C_1$-$C_{10}$)alkylamino represents a group of formula —NR'R" wherein R' and R' are the same or different and represent $C_1$-$C_{10}$ alkyl groups, preferably $C_1$-$C_6$ alkyl groups, as defined previously.

A $C_1$-$C_{10}$ alkylthio group is a said $C_1$-$C_{10}$ alkyl group attached to a thio group.

A $C_1$-$C_{10}$ alkoxy group is a said $C_1$-$C_{10}$ alkyl group attached to an oxygen atom. A $C_1$-$C_6$ alkoxy group is a said $C_1$-$C_6$ alkyl group attached to an oxygen atom. A $C_1$-$C_4$ alkoxy group is a $C_1$-$C_4$ alkyl group attached to an oxygen atom. Examples of $C_1$-$C_4$ alkoxy groups include, —OMe (methoxy), —OEt (ethoxy), —O(nPr) (n-propoxy), —O(iPr) (isopropoxy), —O(nBu) (n-butoxy), —O(sBu) (sec-butoxy), —O(iBu) (isobutoxy), and —O(tBu) (tert-butoxy).

Alkylene and alkyl groups may be interrupted by one or more heteroatoms or heterogroups, such as S, O or $N(R^2)$ wherein $R^2$ is H or $C_1$-$C_6$ alkyl. The phrase "optionally interrupted" as used herein thus refers to a $C_1$-$C_{10}$ alkyl group or an alkylene group, as defined above, which is uninterrupted or which is interrupted between adjacent carbon atoms by a heteroatom such as oxygen or sulfur, or a heterogroup such as $N(R^2)$ wherein $R^2$ is H or $C_1$-$C_6$ alkyl.

For instance, a $C_1$-$C_{10}$ alkyl group such as n-butyl may be interrupted by the heterogroup $N(R^2)$ as follows: —$CH_2N(R^2)CH_2CH_2CH_3$, —$CH_2CH_2N(R^2)CH_2CH_3$, or —$CH_2CH_2CH_2N(R^2)CH_3$. Similarly, an alkylene group such as n-butylene may be interrupted by the heterogroup $N(R^2)$ as follows: —$CH_2N(R^2)CH_2CH_2CH_2$—, —$CH_2CH_2N(R^2)CH_2CH_2$—, or —$CH_2CH_2CH_2N(R^2)CH_2$—.

It is believed that hydrogen bonding is involved in the binding of the substituents Q and/or $Q^2$ to peroxide. The reactivity of the diazo compound and its derived carbene could be modified by including electron releasing or electron withdrawing groups on the aromatic rings.

In formula (III) the or each group Q may occupy any available position on ring A. In formula (IV) the or each group Q and the or each group $Q^2$ may occupy any available position on rings A and B respectively. When parameter "p" is 1, A is mono-substituted at any ring position by Q; for instance, when A is a phenyl group it may be substituted at any of positions 2, 3, 4, 5 and 6. When parameter "p" is 2, A is di-substituted at any two positions by Q; for instance, when A is a phenyl group it may be 2,3- 2,4-, 2,5-, 2,6-, 3,4- or 3,5-disubstituted. When parameter "p" is 3, A is tri-substituted at any three positions by Q; for instance, when A is a phenyl group it may be 2,3,4-, 2,4,5- or 3,4,5-tri-substituted. Likewise, when parameter "r" is 1, B is mono-substituted at any ring position by $Q^2$; for instance, when B is a phenyl group it may be substituted at any of positions 2, 3, 4, 5 and 6. When parameter "r" is 2, B is di-substituted at any two positions by $Q^2$; for instance, when B is a phenyl group it may be 2,3- 2,4-, 2,5-, 2,6-, 3,4- or 3,5-disubstituted. When parameter "r" is 3, B is tri-substituted at any three positions by $Q^2$; for instance, when B is a phenyl group it may be 2,3,4-, 2,4,5- or 3,4,5-tri-substituted.

In formula (I) the or each chain —[$CH_2$—V—(W—R)$_n$] may occupy any available position on rings A and B. When parameter "y" is 1, B is mono-substituted at any ring position by —[$CH_2$—V—(W—R)$_n$]; for instance, when B is a phenyl group it may be substituted at any of positions 2, 3, 4, 5 and 6. When parameter "y" is 2, B is di-substituted at any two positions by —[$CH_2$—V—(W—R)$_n$] for instance, when B is a phenyl group it may be 2,3- 2,4-, 2,5-, 2,6-, 3,4- or 3,5-disubstituted. When parameter "y" is 3, B is tri-substituted at any three positions by –[$CH_2$—V—(W—R)$_n$]; for instance, when B is a phenyl group it may be 2,3,4-, 2,4,5- or 3,4,5-tri-substituted.

Likewise, when parameter "z" is 1, A is mono-substituted at any ring position by —[$CH_2$—V—(W—R)$_n$]; for instance, when A is a phenyl group it may be substituted at any of positions 2, 3, 4, 5 and 6. When parameter "z" is 2, A is di-substituted at any two positions by —[$CH_2$—V—(W—R)$_n$]; for instance, when A is a phenyl group it may be 2,3- 2,4-, 2,5-, 2,6-, 3,4- or 3,5-disubstituted. When parameter "z" is 3, A is tri-substituted at any three positions by —[$CH_2$—V—(W—R)$_n$]; for instance, when A is a phenyl group it may be 2,3,4-, 2,4,5- or 3,4,5-tri-substituted.

Parameter "n" qualifies the moiety represented by –W—R and thus defines the number of hydrogen-bonding groups W that are present in the compounds of formulae (I), (Ia), (III) and (IV). When n is 2 or 3, the moiety —V—(W—R)$_n$ in the chain —[$CH_2$—V—(W—R)$_n$] may be represented, for instance, as —(CR'$_2$)$_p$—CR'(W—R)$_2$, —O—(CR'$_2$)$_p$—CR'(W—R)$_2$, —(CR'$_2$)$_p$—C(W—R)$_3$ or —(CR'$_2$)$_p$—C(W—R)$_3$ wherein p is 0 or an integer of 1 to 10 and each R' is, independently, H or $C_1$-$C_6$ alkyl.

In one embodiment, the compound of formula (I) or formula (III) is of the following formula (Ia):

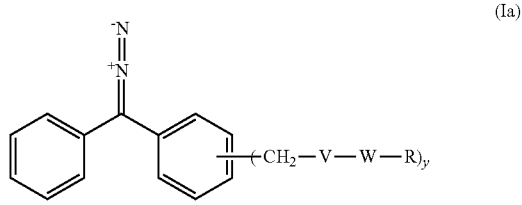

(Ia)

wherein each of y, V, W and R is as defined above.

In another embodiment, the compound of formula (I) or formula (III) is of the following formula (Ib):

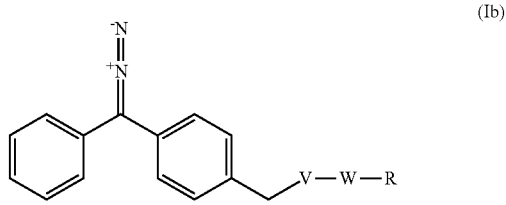

(Ib)

wherein each of V, W and R is as defined above.

A preferred example of a carbene precursor compound of formula (III) or (IV) is 1-{2-[4-(diazo-phenyl-methyl)-benzyloxy]-ethyl}-3-phenyl urea, hereafter compound XIII. This compound may be produced as shown in the following scheme 1. 4-Bromomethylbenzophenone, which can be prepared according to D. D. Tanner et al., *J. Org. Chem.*, 1980, 45, 5177, is first coupled with ethanolamine. The resulting benzophenone may be converted to the urea compound by treatment with phenyl isocyanate in dry dichloromethane. The urea compound may be converted to the hydrazone by treatment with hydrazine hydrate in refluxing methanol overnight, followed by removal of the solvent and extraction into dichloromethane. Oxidation of the hydrazone to the corresponding diazo diarylcarbene precursor may conveniently be performed using mercuric oxide in ether, or any other suitable oxidant.

Scheme 1

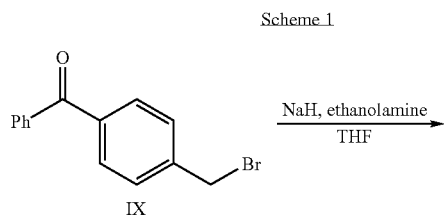

(i) N₂H₄, H₂O, EtOH → XI Z = O
(ii) HgO, Et₂O, KOH, Na₂SO₄ → XII Z = NHNH₂
→ XIII Z = N₂

Carbene precursor compounds of formulae (III) or (IV) in which Q and/or Q² is CH₂—V—(W—R)ₙ, as defined above, may be produced by analogy with the method shown in scheme 1, from starting materials which are commercially available or which may readily be synthesised by known techniques.

Diarylcarbene precursors of formula (II) are known from WO 00/26180. A preferred example of a compound of formula (II) is 4-([N-ethyl-N-phenyl-2-aminoethyl]oxymethyl) phenyl phenyl diazomethane, hereafter compound XVI. This compound may be produced as shown in the following scheme 2:

Scheme 2

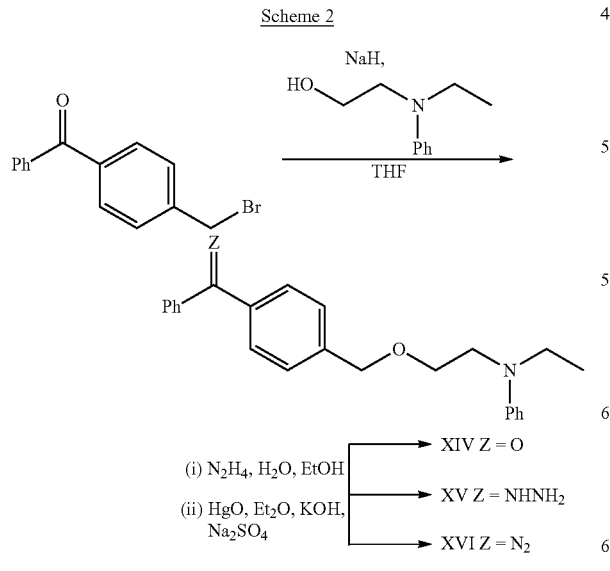

(i) N₂H₄, H₂O, EtOH → XIV Z = O
(ii) HgO, Et₂O, KOH, Na₂SO₄ → XV Z = NHNH₂
→ XVI Z = N₂

A preferred example of a compound of formula (III) or (IV) is bis-4,4'-N,N-dimethylamino diphenyldiazomethane, hereafter compound 3. This compound may be produced as shown in the following Scheme 3. Michler's ketone (1) can be converted to the known hydrazone (2) by reaction with hydrazine hydrate in ethanol. This hydrazone can be oxidised to diazomethane (3) using yellow mercuric oxide in tetrahydrofuran.

Scheme 3

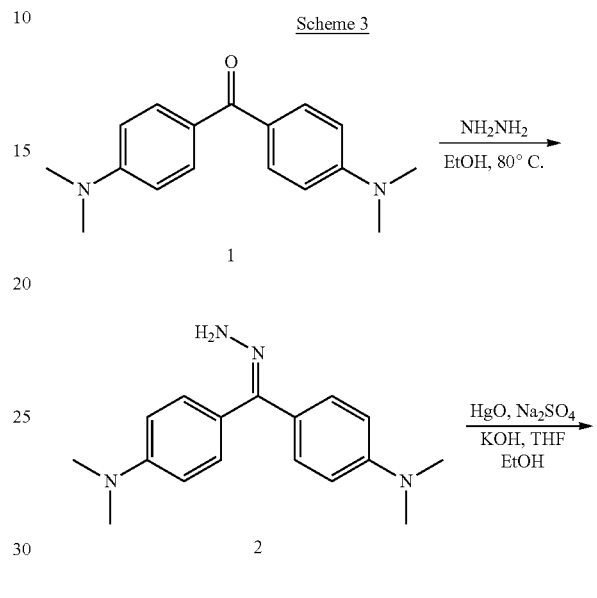

Carbene precursor compounds of formulae (III) or (IV) in which Q and/or Q² is —N(Z₁)(Z₂), as defined above, may be produced by analogy with the method shown in scheme 3, from starting materials which are commercially available or which may readily be synthesised by known techniques.

The method shown in Scheme 3 includes a new procedure for the preparation of the key intermediate 2. This procedure for preparing compound 2 represents a substantial simplification and improvement over the literature protocol (S. Hünig et al., Eur. J. Org. Chem, 2002, 10, 1603-1613).

Accordingly, the present invention further provides a process for producing a compound of formula (VII) or (VIII):

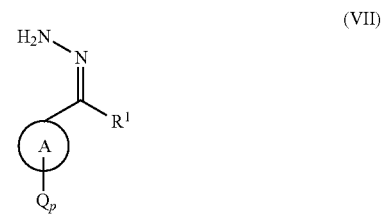

(VII)

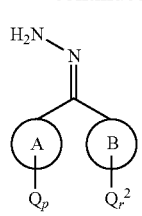

(VIII)

wherein A is an aryl or heteroaryl ring;

B is an aryl or heteroaryl ring;

p is 1, 2, 3, 4 or 5;

r is 1, 2, 3, 4 or 5;

$R^1$ is selected from hydrogen, aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by N($R^2$), O or S wherein $R^2$ is H or $C_1$-$C_6$ alkyl;

Q is —N($Z_1$)($Z_2$);

$Q^2$, which may be the same as or different from Q, is —N($Z_1$)($Z_2$);

$Z_1$ and $Z_2$ are independently selected from aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by N($R^2$), O or S wherein $R^2$ is H or $C_1$-$C_6$ alkyl;

the process comprising treating a compound of formula (V) or (VI) with hydrazine in the presence of heat and a solvent:

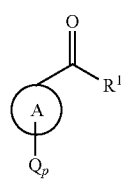

(V)

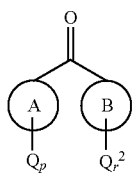

(VI)

wherein A, B, Q, $Q^2$, p, r and $R^1$ are as defined above.

Typically, hydrazine is used in the form of hydrazine hydrate. Any suitable solvent is employed, for instance a polar protic solvent such as an alcohol. Typically, the solvent is ethanol. The reaction is carried out with heating, typically at the reflux temperature of the solvent used. For example, when the solvent is ethanol the reaction is suitably carried out at a temperature of 78° C. or higher, e.g. at a temperature of 80° C.

The resulting compounds of formulae (VII) and (VIII) may subsequently be converted into carbene precursor compounds of formulae (III) and (IV), respectively, as defined above. Accordingly, in one embodiment, the process as defined above further comprises oxidising a compound of formula (VII) or (VIII) to produce a carbene precursor compound of formula (III) or (IV) respectively:

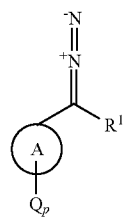

(III)

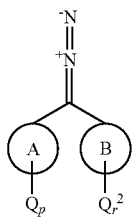

(IV)

wherein A, B, Q, $Q^2$, p, r and $R^1$ are as defined above.

Any suitable oxidant may be used. Typically, the oxidant is mercuric oxide in an aprotic polar solvent, for instance tetrahydrofuran (THF) or an ether. More typically, this oxidation is conducted in the presence of a base, for instance a metal hydroxide and sodium sulphate. The metal hydroxide is typically an alkali metal hydroxide, for instance potassium hydroxide. A saturated solution of the metal hydroxide is generally used. The solvent used for the metal hydroxide is suitably a polar protic solvent such as an alcohol, for instance ethanol. The solvent used for the solution of the compound of formula (VII) or (VIII) is suitably a polar aprotic solvent, for instance tetrahydrofuran.

The carbene precursor compound of formula (III) or (IV) thus produced may be employed as the carbene precursor in step (a) of the process of the invention for producing a substrate having a functionalised surface, as defined above.

By "carbene reactive intermediate", as used herein, is meant a reactive species comprising a formally divalent carbon atom. The carbene reactive intermediate is generated from the carbene precursor of formula (II) or (IV) by treatment under conditions which result in an irreversible covalent reaction with the substrate. Generally the carbene is generated by heating or irradiating the substrate and pre-adsorbed carbene precursor compound; since the carbene precursor of formula (II) or (Iv) is usually intensely coloured (red-orange), the formation and insertion of the carbene is most conveniently monitored by decolourisation.

The coloured substrates produced by the process of the present invention may be used in the dye industry for the preparation of non-leaching dyed polymers, such an example would be in food and drink packaging; they may be used to confer specific wavelength absorbing properties such as ultra-violet or infrared absorption; the ability of the substrates to show photochromism could be utilised in the medical market for contact lenses; the introduction of fluorescent markers allows security tagging applications. The coloured substrates produced by the present invention are capable of being irreversibly dyed with little or no leaching from the surface, which is an important practical advantage associated with their use.

The biocidal polymeric substrates produced by the process of the present invention may be used in many different fields, but they particularly have utility in any context where the occurrence of bacterial, viral or fungal infection is a risk. For instance, they may have medical, industrial, catering, domestic, public health or military applications. Hydrogen peroxide-based biocidal agents are tasteless and odourless and are therefore preferable in many contexts to chlorine-based biocides.

The biocidal polymeric substrates are effective against a wide range of micro-organisms including Gram-positive and Gram-negative bacteria, as well as viruses. Specific examples of bacteria include S. Aureus and E. Coli.

Specific examples of the downstream uses of biocidal polymeric substrates produced by the process of the present invention include use in water purification systems, both small-scale and industrial; use in water filtration systems, for instance water filter cartridges for domestic and military use, in emergency applications and disaster relief; use in air purification systems, for instance air recirculation systems in aircraft, breathing apparatus and environmental protection products; use in medical and military equipment and clothing such as surgical gowns, surgical masks and surgical instruments; and use in medical devices such as implants, stents and catheters.

The biocidal polymeric substrates produced by the process of the present invention are capable of being regenerated on multiple occasions after use by treatment with hydrogen peroxide, which is an important practical advantage associated with their use. Regeration may be achieved by simple re-washing of the substrate with aqueous hydrogen peroxide.

The process is extendable from chromophoric and biocidal applications to include other chemical and reactive functionality. The process may be used to produce a substrate having a surface of a particular hydrophobicity or hydrophilicity, for example.

The present invention is further illustrated in the Examples which follow:

EXAMPLE 1

Preparation of 1-{2-[4-(Diazo-phenyl-methyl)-benzyloxy]-ethyl}-3-phenyl Urea (XIII)

4-(Aminoethoxymethyl)benzophenone hydrochloride (X)

To a solution of dry ethanolamine (1.0 g, 16.4 mmol) in dry THF (5 ml) was added sodium hydride (0.7 g, 60% dispersion in mineral oil, 16.4 mmol) in several portions over a period of 5 minutes. A further aliquot of dry THF (5 ml) was added and the resulting mixture stirred for 1 h. To this mixture was added a solution of 4-bromomethyl benzophenone (IX) (4.5 g, 16.4 mmol) in dry THF (25 ml). The resulting mixture was allowed to stir for 18 h. before being concentrated in vacuo. The residue was partitioned between chloroform and water and the organic layer collected, washed with water then extracted with 2M HCl. The combined acidic extractions were washed once with chloroform before being concentrated in vacuo. The residue was dissolved in a 9:1 chloroform:methanol mixture and dried over sodium sulfate before being concentrated in vacuo to yield (X) (2.6 g, 55%) as a pale yellow solid which was used without further purification.

1-[4-Benzoyl-benzyloxyethyl]-3-phenyl urea (XI)

To a stirred suspension of (X) (3.49 g, 12 mmol) in dry DCM (10 ml) was added dry triethylamine (10 ml). After 0.25 h. stirring a solution of phenyl isocyanate (2.14 g, 18 mmol) in dry DCM (10 ml) was added in one portion. The mixture was stirred for a further 16 h. then quenched with water (10 ml). The organic layer was collected and washed sequentially with water, 2M HCl, and water. The organic layer was dried over $MgSO_4$ and purified by flash chromatography on silica gel eluting with 2:1 petrol 40/60:ethyl acetate ($R_f$=0.1) to yield (XI) (3.01 g, 67%) as a white solid; m.p. 129-132° C.; $\delta H$ (DMSO-d, 200 MHz) 3.39 (q, 2H, J=5.1 Hz, $NHCH_2$), 3.58 (t, 2H, J=5.0 Hz, $OCH_2CH_2$), 4.65 (s, 2H, $OCH_2Ar$), 6.32 (t, 1H, J=5.2 Hz $CH_2NHC(O)NHAr$), 6.90 (t, 1H, J=7.3 Hz, 4"-H), 7.24 (t, 2H, J=7.4 Hz, 3"-, 5"-H), 7.44 (d, 2H, J=7.6 Hz, 2"-, 6"-H), 7.56 (m, 4H, 3-, 5-, 3'-, 5'-H), 7.70 (m, 5H, 2-, 4-, 6-, 2"-, 6"-H) 8.63 (s, 1H, $CH_2NHC(O)NHAr$) ppm; $\delta C$ (DMSO-d, 400 MHz) 39.9 ($CH_2CH_2NH$), 70.4 ($CH_2CH_2O$), 72.1 ($ArCH_2O$), 118.4 (2"-, 6"-C), 121.9 (4"-C), 128.1 (2-, 6-, 2'-, 6'-C), 129.4 (3"-, 5"-C), 130.4, 130.6 (3-, 5-, 3'-, 5'-C), 133.5 (4'-C), 136.9, 138.0 (1-, 1"-C), 141.3 (4-C), 144.4 (1"-C), 156.1 (N(H)C(O)NH), 196.3 ($Ar_2C(O)$) ppm; max 3431 (N—$H_{str}$), 1724 ($(R(H)N)_2C=O_{str}$), 1658 ($Ar_2C=O_{str}$) $cm^{-1}$; m/z 375 $[M+H]^+$ (5%), 397 $[M+Na]^+$ (10%), 433 $[M+MeCN+NH_4]^+$ (100%); found 375.1703, $C_{23}H_{23}N_2O_3$ requires 375.1709.

1-{2-[4-(Hydrazono-phenyl-methyl)-benzyloxy]-ethyl}-3-phenyl urea (XII)

A solution of (XI) (0.7 g, 1.9 mmol) in methanol (10 ml) was treated with hydrazine hydrate (1.9 g, 38 mmol). The resulting solution was heated to a gentle reflux for 16 h., cooled and concentrated in vacuo. The residue was partitioned between DCM and water and the organic layer was collected, washed with water and dried over $MgSO_4$. Concentration in vacuo yielded (XII) (0.7 g, 99%) as a thick cloudy white oil; $\delta H$ ($CDCl_3$, 200 MHz) 3.47 (m, 2H, N(H)$CH_2CH_2$), 3.61 (m, 2H, $OCH_2CH_2$), 4.43, 4.52 (s, 2H, $ArCH_2O$), 5.49 (s, 2H, $NNH_2$), 6.55 (m, 1H, $CH_2NHC(O)$), 6.99 (m, 1H, 4"-H), 7.22 (m, 7H, 3-, 3'-, 3"-, 4'-, 5-, 5'-, 5"-H), 7.46 (m, 6H, 2-, 2'-, 2"-, 6-, 6'-, 6"-H), 7.80 (m, 1H, ArNHC(O)) ppm; $\upsilon$max 3435 (N—$H_{str}$), 1734 ($(R(H)N)_2C=O_{str}$) $cm^{-1}$; m/z 389 $[M+H]^+$ (15%), 447 $[M+MeCN+NH_4]^+$ (100%); found 389.1973, $C_{23}H_{25}N_4O_2$ requires 389.1978.

1-{2-[4-(Diazo-phenyl-methyl)-benzyloxy]-ethyl}-3-phenyl urea (XIII)

To a vigorously stirred mixture of yellow mercury oxide (0.18 g, 0.8 mmol), sodium sulfate (0.14 g, 1 mmol) and sat. KOH in ethanol (1 ml) was added a solution of (XII) (0.27 g, 0.7 mmol) in THF (10 ml). The mixture was stirred for 16 h. in the dark, then filtered through a pad of celite. The filtrate was collected and concentrated in vacuo to yield (XIII) (0.27 g, 100%) as a dark red solid; m.p. 111-115° C., decolurises at 136° C.; $\delta H$ ($CDCl_3$, 200 MHz) 3.43 (m, 2H, $CH_2CH_2NH$), 3.69 (m, 2H, $CH_2CH_2O$), 4.49 (s, 2H, $ArCH_2O$), 5.80 (bs, 1H, $CH_2NHC(O)$), 7.02 (m, 1H, 4"-H), 7.41-7.44 (m, 13H, Ar—H), 7.44 (s, 1H, ArNHC(O)) ppm; $\delta C$ ($CDCl_3$, 400 MHz) 40.3 ($CH_2NH$), 62.4 ($CH_2CH_2O$), 68.0 ($ArCH_2O$), 120.3 (4"-C), 123.2 (4'-C), 125.0, 125.8, 126.5, 126.7 (2-, 2'-, 2"-, 6-, 6'-, 6"-C), 128.9, 129.1, 129.2, 129.3 (1-, 1'-, 3-, 3'-, 3"-, 5-, 5'-, 5"-C), 135.0, 138.9 (4-, 1"-C), 156.5 (NHC(O)NH) ppm; υmax 3344 (N—H$_{str}$), 2042 (R$_2$C=N=N), 1658 ((R(H)N)$_2$C=O$_{str}$) cm$^{-1}$; m/z 445 [M+MeCN+NH$_4$]$^+$ (100%).

REFERENCE EXAMPLE 1

Preparation of
4-([N-Ethyl-N-phenyl-2-aminoethyl]oxymethyl)phenyl phenyl diazomethane (XVI)

4-([N-Ethyl-N-phenyl-2-aminoethyl]oxymethyl) benzophenone (XIV)

2-(N-Ethylanilino)ethanol (3.03 g, 18.4 mmol, 1.2 eq) in THF (20 cm$^3$) was treated with NaH (60% dispersion in oil, 524 mg, 13.1 mmol, 1.4 eq) and stirred at 20° C. for 1 hour. 4-Bromomethylbenzophenone (IX) (4.21 g, 15.3 mmol) was then added and stirring continued for 72 hours. Excess solvent was removed in vacuo and the residue diluted with DCM, washed with water and NaHCO$_3$ solution (sat.), dried (MgSO$_4$) and solvent removed under vacuum. The resulting oil was purified by flash chromatography, eluting with petroleum (bp 40-60° C.):EtOAc (9:1), to give the desired product (XIV) as a yellow oil (4.36 g, 80%), R$_f$=0.54 (4:1, petrol:EtOAc) (Found: C, 78.34; H, 6.86; N, 5.29. C$_{24}$H$_{25}$NO$_2$ requires C, 80.19; H, 7.01; N, 3.90%); υ$_{max}$ (film/cm$^{-1}$ 1658 (s), 1598 (s), 1506 (s); δ$_H$ (200 MHz; CDCl$_3$) 1.22 (3H, t, J7, CH$_3$), 3.49 (2H, q, J7, CH$_2$CH$_3$), 3.58-3.79 (4 H, m, OCH$_2$CH$_2$N), 4.66 (2H, s, ArCH$_2$O), 6.69-6.79 (3H, m, ArH o- and p- to NR$_2$), 7.28 (2H, dd, J7, 7, ArH m- to NR$_2$), 7.46-7.68 (5H, m, ArH), 7.80-7.88 (4H, m, ArH o- to C=O); δ$_C$ (50.3 MHz; CDCl$_3$) 12.2 (CH$_3$), 45.5 (NCH$_2$CH$_3$), 50.1 (NCH$_2$CH$_2$O), 68.5 (NCH$_2$CH$_2$O), 72.2 (ArCH$_2$O), 111.8 (ArCH o- to NR$_2$), 115.8 (ArCH p- to NR$_2$), 127.0, 128.3, 129.3, 130.0 and 130.3 (ArCH o- and m- to C=O and ArCH m- to NR$_2$), 132.4 (ArCH p- to C=O), 136.8 and 137.7 (4O Ar CC=O), 143.2 (4O ArCCH$_2$O), 147.7 (4O ArCNR$_2$), 196.4 (C=O); n/z (APCI$^+$) 360 ([M+H]$^+$, 30%); HRMS C$_{24}$H$_{26}$O$_2$N requires 360.1963; found 360.1963.

4-([N-Ethyl-N-phenyl-2-aminoethyl]oxymethyl) benzophenone hydrazone (XV)

The above benzophenone (701 mg, 1.95 mmol) was reacted with hydrazine hydrate yielding the hydrazone (XV) as a colourless oil (710 mg, 97%), υ$_{max}$ (film)/cm$^{-1}$ 1598 (s), 1506 (s); δ$_H$ (500 MHz; CDCl$_3$) 1.27 and 1.31 (3H, 2* t, J7, CH$_3$), 3.52 and 3.57 (2H, 2* q, J7, CH$_2$CH$_3$), 3.60-3.87 (4H, m, NCH$_2$CH$_2$O), 4.63 and 4.71 (2H, 2* s, ArCH$_2$O), 5.57 (2H, br s, NNH$_2$), 6.76-6.87 (3H, m, ArH o- and p- to NR$_2$), 7.30-7.42 (7H, m, ArH), 7.53-7.64 (4H, m, ArH o- to C=N); δ$_C$ (125.8 MHz; CDCl$_3$) 12.0 (CH$_3$), 45.1 and 45.2 (NCH$_2$CH$_3$), 49.8 (NCH$_2$CH$_2$O), 67.8 and 68.1 (OCH$_2$CH$_2$N), 72.6 and 72.7 (ArCH$_2$O), 111.5 and 111.6 (ArCH o- to NR$_2$), 115.5 and 115.6 (ArCH p- to NR$_2$), 126.2, 127.1, 127.7, 127.8, 128.1, 128.5, 128.6, 128.9, 129.0 and 129.1 (ArCH), 131.9 and 132.8 (4° ArCCH$_2$O), 137.7, 137.8, 138.3 and 138.9 (4° Ar CC=N), 147.5 (4° ArCNR$_2$), 148.1 (C=NNH$_2$); m/z (APCI$^+$) 374 ([M+H]$^+$, 5%), 357 (5%), 209 (100%).

4-([N-Ethyl-N-phenyl-2-aminoethyl]oxymethyl)phenyl phenyl diazomethane (XVI)

The above benzophenone hydrazone (701 mg, 1.88 mmol) was reacted with mercuric oxide and sodium sulphate yielding the diazomethane (XVI) as a purple liquid (690 mg, 99%) (Found: C, 78.06; H, 6.89; N, 12.36. C$_{24}$H$_{25}$N$_3$O requires C, 77.60; H, 6.78; N, 11.31%); υ$_{max}$ (film)/cm$^{-1}$ 2037 (s), 1559 (m); δ$_H$ (500 MHz; CDCl$_3$) 1.26-1.32 (3H, m, CH$_3$), 3.50-3.80 (6H, m, NCH$_2$CH$_3$ and NCH$_2$CH$_2$O), 4.65 (2H, s, ArCH$_2$O), 6.78-6.86 (3 H, m ArH o- and p- to NR$_2$), 7.28-7.65 (11H, m ArH); δ$_C$ (125.8 MHz; CDCl$_3$) 12.1 (CH$_3$), 45.3 (NCH$_2$CH$_3$), 50.0 (NCH$_2$CH$_2$O), 67.9 (OCH$_2$CH$_2$N), 72.8 (ArCH$_2$O), 111.7 (ArCH o- to NR$_2$), 115.6 (ArCH p- to NR$_2$), 125.0, 125.5, 126.3, 128.3, 128.4, 128.7, 129.0, 129.1 and 129.2 (4° ArC and ArCH), 135.7 (4° ArCCH$_2$O), 147.7 (4° Ar CNR$_2$); m/z (APCI$^+$) 344 ([M−N$_2$]$^+$, 20%), 209 (100).

EXAMPLE 2

Preparation of Functionalised Polymer Beads/Powder

To a solution in dry THF of compound (XIII) described in Example 1, or compound (XVI) described in Reference Example 1, was added the required polymer and the mixture concentrated in vacuo. The resulting dark red stained polymer was collected and heated using a heat gun until the dark red coloration had disappeared. The resulting solid was placed in the extraction thimble and Soxhlet extracted with acetone for 12 h. The solid was collected and dried to yield the functionalised polymer.

TABLE 1

Functionalised polymers prepared

| Sample | Compound | Polymer | Ratio[a] |
|---|---|---|---|
| A | XIII | Silica[e] | 1:1 |
| B | XIII | XAD-4[b] | 1:1 |
| C | XIII | UHMWPE[c] | 1:1 |
| D | XIII | UHMWPE[c] | 2:1 |
| E | XIII | PTFE[d] | 1:1 |
| F | XVI | XAD-4[b] | 1:1 |

[a]Weight-weight Ratio of compound 1 or 2 to polymer used during functionalisation step;
[b]Amberlite XAD-4 non ionic absorbant (Aldrich 21,648-8);
[c]Ultra high molecular weight polyethylene powder (Aldrich 43,426-4
[d]Polytetrafluoroethylene beads (Aldrich 18,247-8)
[e](Sorbsil ™ C$_{60}$H(40-60 μM) silica gel).

EXAMPLE 3

Hydrogen Peroxide Loading on Functionalised Polymers

Method for Hydrogen Peroxide Loading

A sample of the required polymer was suspended in 50% aqueous hydrogen peroxide for 1 hour and the polymer was collected by filtration and washed with 1-1.51 of water, collected and treated with a solution of 10% potassium iodide in aqueous acetic acid. After standing for 5 minutes, a 1% aqueous starch solution was added, and the suspension left to stand for 1 hr. The resulting dark blue colour solution was titrated with sodium thiosulfate until the colourless endpoint. The mixture was left for a further hour and any further blue coloration of the solution was further titrated with sodium thiosulfate.

TABLE 2

Hydrogen peroxide loading on functionalised polymers.

| Sample | Starch-Iodide test | Loading of hydrogen peroxide/mol g$^{-1}$ | Average loading of Hydrogen peroxide Mol g$^{-1}$ |
|---|---|---|---|
| A | + | 7.45 × 10$^{-5}$ | — |
| B | + | 8.60 × 10$^{-5}$; 9.91 × 10$^{-5}$ 6.64 × 10$^{-5}$ | 8.30 × 10$^{-5}$ |
| C | + | 2.50 × 10$^{-5}$ | 2.50 × 10$^{-5}$ |
| D | + | 6.18 × 10$^{-5}$ | 6.18 × 10$^{-5}$ |
| E | + | 1.07 × 10$^{-5}$ | 1.07 × 10$^{-5}$ |
| F | + | 1.04 × 10$^{-5}$; 2.11 × 10$^{-5}$; 9.82 × 10$^{-5}$; 9.41 × 10$^{-5}$ | 1.27 × 10$^{-5}$ |
| XAD-4 (control) | − | N/D | — |
| UHMWPE (control) | − | N/D | — |
| PTFE (control) | − | N/D | — |

N/D = Not detected;
+ = blue colour

EXAMPLE 4

Stability of Hydrogen Peroxide Functionalised Polymer

Method for the stability testing of hydrogen peroxide functionalised polymer A sample of the functionalised polymer B (50 mg), described in Example 3, was suspended in 50% aqueous hydrogen peroxide for 18 hr. The polymer was collected by filtration and washed with 1-1.5 l of water, collected in a stoppered vial and stored at room temperature in a darkened cupboard. At regular time intervals 10 mg samples were collected and tested for the hydrogen peroxide loading using the above procedure.

TABLE 3

Stability of hydrogen peroxide functionalised polymer B.

| Time interval/h | Loading of hydrogen peroxide/mol g$^{-1}$ |
|---|---|
| 0 | 8.42 × 10$^{-5}$ |
| 24 | 8.01 × 10$^{-5}$ |
| 48 | 9.61 × 10$^{-5}$ |
| 72 | 6.44 × 10$^{-5}$ |
| 96 | 4.13 × 10$^{-5}$ |

EXAMPLE 5

Regenerability of Hydrogen Peroxide Loading on Functionalised Polymers

Method for the Regenerability Testing of Hydrogen Peroxide Functionalised Polymer A sample of the required polymer (0.05 g) was suspended in 50% aqueous hydrogen peroxide (2 ml) for 18 h. The polymer was collected by filtration and washed with 1-1.5 l of water, collected and treated with solution of 10% potassium iodide in acetic acid and water. After standing for 5 minutes a 1% aqueous starch solution was added and the suspension left to stand for 1 h. A positive test for hydrogen peroxide was the formation of a dark blue coloured solution. This mixture was then quenched with sodium thiosulfate until colourless and the polymer filtered and washed with 1-1.5 l of water. The polymer was then re-suspended in fresh 50% aqueous hydrogen peroxide (2 ml) and the cycle repeated.

The above procedure was carried out using polymer samples B and F described in Example 3. The results are shown in the following Table 4:

TABLE 4

Regenerability of hydrogen peroxide functionalised polymers B and F

| Polymer B | | Polymer F | |
|---|---|---|---|
| Cycle | Starch iodide test | Cycle | Starch iodide test |
| 1 | + | 1 | + |
| 2 | + | 2 | + |
| 3 | + | 3 | + |
| 4 | + | 4 | + |
| 5 | + | 5 | + |
| 6 | + | 6 | + |
| 7 | + | 7 | + |

+ = blue colour.

EXAMPLE 6

Bioassay

Method for Bioassay

An agar plate inoculated with the chosen organism was punched with 10 mm wells. To these wells was added 20 μl of molten agar. When set the polymer sample was added to the well so that a thin layer of polymer was produced. The well was then sealed with a further 50 μl of molten agar, the plate incubated overnight at 37° C. and the diameter of the inhibition zones measured.

The results obtained with two different microorganism strains are set out in the following Tables 5 and 6.

(a) *S Aureus*

TABLE 5

Zones of inhibition results against *S. Aureus* using 10 mm wells in Hole-Plate Bioassay (against Ceph C standard)

| Sample | Weight of polymer/mg | Zone/mm |
|---|---|---|
| B (control) | 50 | N/D |
| B + H$_2$O$_2$ | 50 | 25 |
| B + H$_2$O$_2$ | 50 | 18 |
| B + H$_2$O$_2$ | 25 | 19 |
| F (control) | 50 | N/D |
| F + H$_2$O$_2$ | 50 | 14 |
| F + H$_2$O$_2$ | 50 | 12 |
| F + H$_2$O$_2$ | 50 | 12 |
| XAD-4 + H$_2$O$_2$ (control) | 50 | N/D |
| C (control) | 50 | N/D |
| C + H$_2$O$_2$ | 54 | N/D |
| UHMWPE + H$_2$O$_2$ | 51 | N/D |
| E (control) | 50 | N/D |
| E + H$_2$O$_2$ | 50 | N/D |
| PTFE + H$_2$O$_2$ | 51 | N/D |

N/D = Not detected

TABLE 6

Zone of inhibition results against *E. Coli* using 10 mm wells in Hole-Plate Bioassay (against Ceph C standard)

| Sample | Weight of polymer/mg | Zone/mm |
|---|---|---|
| B (control) | 50 | N/D |
| B + H$_2$O$_2$ | 54 | 17 |
| F (control) | 10 | N/D |
| F + H$_2$O$_2$ | 12 | 12 |
| XAD-4 + H$_2$O$_2$ | 50 | N/D |

N/D = Not detected.

EXAMPLE 7

Preparation of bis-4,4'-N,N-dimethylamino Diphenyldiazomethane (3)

Bis-4,4'-N,N-dimethylamino diphenyldiazomethane (3) was prepared and polymers were functionalised as shown in Scheme 4.

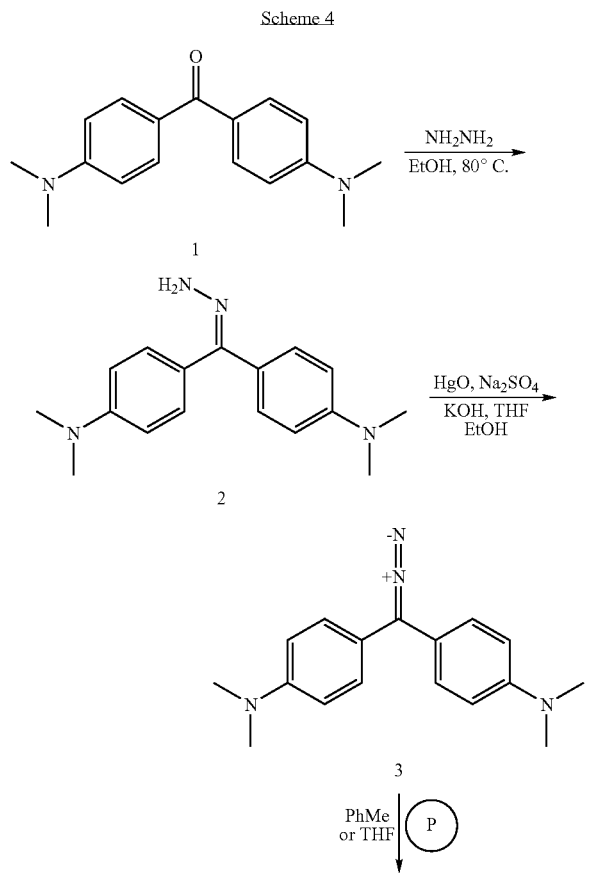

Scheme 4

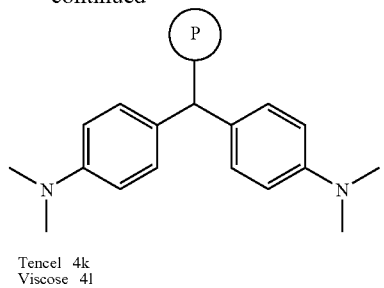

P = XAD-4    4a      Tencel    4k
PSXL-S    4b      Viscose    4l
UHMWPE    4c      NK-Cotton    4m
SMUHMWPE    4d      MW-Cotton    4n
PE-S    4e      Cotton Wool    4o
PP    4f      PET    4p
PP-S    4g      Silica Gel    4q
N-610    4h      Alumina    4r
Hybond-N    4i      Nomex    4s
Kevlar    4j

4,4-Bis-N,N-dimethylamino benzophenone hydrazone (2)

A suspension of Michler's ketone (5.0 g, 19 mmol) in ethanol (10 ml) was treated with hydrazine hydrate (5.0 ml, 100 mmol). The resulting mixture was heated to a gentle reflux for 72 h., cooled and concentrated in vacuo. The residue was diluted with 2-propanol (50 ml) and the resulting solid collected by filtration and dried in vacuo to yield 2 (4.8 g, 91%) as a beige solid; m.p. 151-152° C.; $\delta_H$ (d$_6$-DMSO, 200 MHz) 2.89 (s, 2H, 2xNCH$_3$), 2.97 (s, 2H, 2xNCH$_3$), 5.81 (br s, 2H, NNH$_2$), 6.64 (d, 2H, J=8.9 Hz, 3-, 5-H), 6.86 (d, 2H, J=8.8 Hz, 3'-, 5'-H), 7.05 (d, 2H, J=8.8 Hz, 2'-, 6'-H), 7.22 (d, 2H, J=8.9 Hz, 2-, 6-H) ppm; $\delta_C$ (d$_6$-DMSO, 200 MHz) 40.9 (4x NCH$_3$), 112.6 (3-, 5-C), 113.2 (3'-, 5'-C), 121.1 (1-C), 127.8 (2-, 6-C), 128.7 (1'-C), 130.3 (2'-, 6'-C), 150.6 (Ar$_2$C=NNH$_2$) ppm; $\upsilon_{max}$ 1626, 1545, 1350, 1180 cm$^{-1}$; ms 283 ([M+H]$^+$, 100%), 305 ([M+Na]$^+$, 10%).

Bis-4,4'-N,N-Dimethylaniline Diazomethane (3)

To a vigorously stirred mixture of yellow mercury oxide (0.46 g, 2.1 mmol), sodium sulfate (0.35 g, 2.5 mmol) and sat. potassium hydroxide in ethanol (3 ml) was added a solution of 2 (0.5 g, 1.8 mmol) in tetrahydrofuran (10 ml). The mixture was stirred for 18 h. in the dark, then filtered through a pad of celite. The filtrate was collected and concentrated in vacuo to yield 3 (0.5 g, 100%) as a dark green solid; m.p. 94° C. (dec.); $\delta_H$ (CDCl$_3$, 200 MHz) 2.96 (s, 12H, 4xNCH$_3$), 6.81 (d, 4H, J=6.8 Hz, 3-, 3'-, 5-, 5'-H), 7.17 (d, 4H, J=6.8 Hz, 2-, 2'-, 6-, 6'-H) ppm; $\delta_C$ (CDCl$_3$, 200 MHz) 149.1 (4-, 4'-C), 132.7 (1-, 1'-C), 126.8 (3-, 3'-, 5-, 5'-C), 114.0 (2-, 2'-, 6-, 6'-C), 41.1 (4xNCH3) ppm; $\upsilon_{max}$ 2020 (Ar$_2$C=N$^+$=N$^-$), 1606, 1519, 1356 cm$^{-1}$.

EXAMPLE 8

Functionalisation of Polymer Beads/Powder/Fabric (4a-q)

To a solution of 3 in either toluene or tetrahydrofuran (10 ml) (Table 1) was added the required polymer and the mixture concentrated in vacuo. The polymer was collected and heated in vacuo to 110° C. for 15 minutes. The resulting solid was Soxhlet extracted with acetone for 6 h and the solid collected and dried to yield the functionalised polymer 4a-q (Table 7).

TABLE 7

Functionalised polymers prepared.

| Sample | Polymer | Form | Ratio[a] | Solvent[b] |
|---|---|---|---|---|
| 4a | XAD-4[c] | Beads | 1:1 | Tetrahydrofuran |
| 4b | PSXL-S[d] | Sheet | 1:1 | Tetrahydrofuran |
| 4c | UHMWPE[e] | Powder | 1:1 | Tetrahydrofuran |
| 4d | SMUHMWPE[f] | Powder | 1:1 | Tetrahydrofuran |
| 4e | PE-S[g] | Film | 1:2 | Toluene |
| 4f | PP[h] | Pellets | 1:1 | Toluene |
| 4g | PP-S[h] | Sheet | 1:2 | Tetrahydrofuran |
| 4h | N-610[i] | Granules | 1:4 | Tetrahydrofuran |
| 4i | Hybond-N | Sheet | 1:1 | Tetrahydrofuran |
| 4j | Kevlar | Fabric | 1:1 | Tetrahydrofuran |
| 4k | Tencel | Fabric | 1:2 | Tetrahydrofuran |
| 4l | Viscose | Fabric | 1:2 | Tetrahydrofuran |
| 4m | NK-Cotton[j] | Fabric | 1:2 | Tetrahydrofuran |
| 4n | MW-Cotton[k] | Fabric | 1:2 | Tetrahydrofuran |
| 4o | Cotton wool | Fibre | 1:1 | Tetrahydrofuran |
| 4p | PET[l] | Granules | 1:4 | THF |
| 4q | Silica Gel | Powder | 1:1 | THF |
| 4r | Alumina | Powder | 1:1 | THF |
| 4s | Nomex | Fabric | 1:1 | Toluene |

Table 7
[a]Ratio of diazomethane to polymer used during functionalisation step.
[b]Solvent used for diazo absorption onto the polymer.
[c]Amberlite XAD-4.
[d]Cross Linked Polystyrene.
[e]Ultra High Molecular Weight Polyethylene.
[f]Surface Modified Ultra High Molecular Weight Polyethylene.
[g]Polyethylene.
[h]Polypropylene.
[i]Nylon-610.
[j]Normal Knitted Cotton.
[k]Mercerised Woven Cotton.
[l]Poly(ethylene terephthalate).

EXAMPLE 9

Dyeing of Polymers (i) Fast Black Dyed Polymers 6a-6r

Polymers 4a-r were dyed by immersing the functionalised polymer in a 0.1 M solution of fast black K salt 5 in acetone for 18 h. The polymer was then collected by filtration and washed with acetone to furnish the corresponding diazo polymers 6a-r (Table 2, Scheme 5).

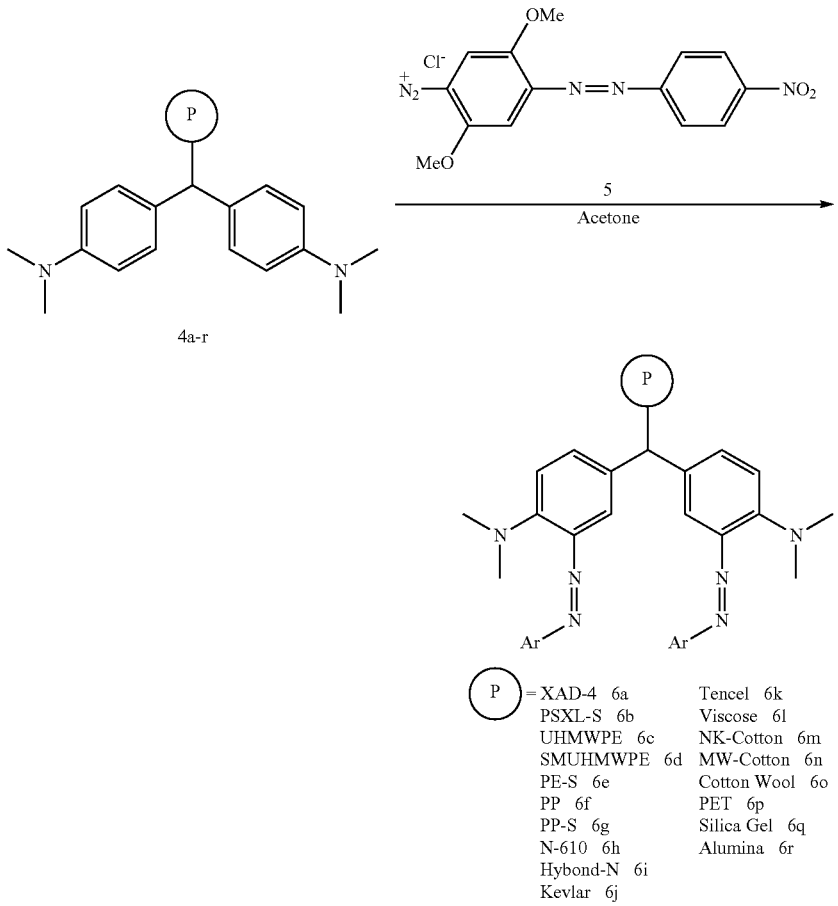

Scheme 5

(ii) 4-N,N-Dimethylamino Benzene Diazonium Dyed Polymer

Preparation of 4-N,N-Dimethylamino benzene diazonium chloride (7)

To an ice cold solution of N,N-Dimethyl-p-phenylene diamine (1.0 g, 7.3 mmol) in ethanol (10 ml) was added concentrated hydrochloric acid (0.72 ml, 7.3 mmol) and isoamyl nitrite (1.6 ml, 12 mmol). The mixture was stirred for 10 minutes, than diluted with diethyl ether (50 ml). The resulting solid was filtered and washed with diethyl ether. Drying in vacuo yielded 6 (1.1 g, 77%) as a dark green solid. $\delta_H$ ($d_6$-DMSO, 200 MHz) 3.29 (s, 6H, 2xNCH$_3$), 7.10 (d, 2H, J=7.8 Hz, 3-, 5-H), 8.30 (d, 2H, J=7.8 Hz, 2-, 6-H) ppm; $\delta_C$ ($d_6$-DMSO, 200 MHz) 157.0 (4-C), 134.9 (2-, 6-C), 114.8 (3-, 5-C), 89.91 (1-C), 41.4 (2xNCH$_3$) ppm.

4-N,N-Dimethylamino benzene Diazonium Dyed UHMWPE (8)

UHMWPE 4c was immersed in a 1M solution of 7 in methanol for 18 h. The polymer was collected by filtration and washed with acetone, water and methanol to furnish the corresponding diazo polymer 8 (Table 8).

Scheme 6

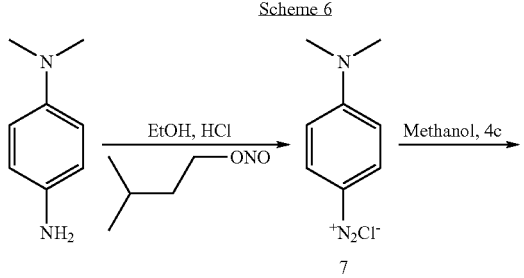

TABLE 8

| Dyed polymers prepared | | | |
|---|---|---|---|
| Sample | Colour | Sample | Colour |
| 4a | Yellow | 4k | Pale Yellow |
| 6a | Black | 6k | Green/Brown |
| XAD-4 + 5 | Brown/Orange | Tencel + 5 | Light Brown |
| 4b | Yellow | 4l | Pale Yellow |
| 6b | Black | 6l | Brown |
| PSXL-S + 5 | Pale Orange | Viscose + 5 | Pale Beige |
| 4c | Yellow | 4m | Pale Yellow |
| 6c | Dark Brown | 6m | Dark Brown |
| UHMWPE + 5 | White | NK-Cotton + 5 | Light Brown |
| 4d | Yellow | 4n | Pale Yellow |
| 6d | Bark brown | 6n | Dark Brown |
| SMUHMWPE + 5 | Pale Pink | MW-Cotton + 5 | Light Brown |
| 4e | Pale Yellow | 4o | White |
| 6e | Orange/Brown | 6o | Dark Brown |
| PE-S + 5 | Clear | Cotton wool + 5 | Light Brown |
| 4f | Yellow | 4p | White |
| 6f | Black | 4p | Brown |
| PP + 5 | White | PET + 5 | Light Orange |
| 4g | Pale Yellow | 4q | Light brown |
| 6g | Dark Orange | 6q | Dark Brown |
| PP-S + 5 | Clear | Silica + 5 | White |
| 4h | Pale Yellow | 4r | Pale Yellow |
| 6h | Brown | 6r | Black |
| N-610 + 5 | Clear | Alumina + 5 | Orange |
| 4i | Pale Yellow | 4c | Yellow |
| 6i | Purple | 8 | Dark green |
| Hybond-N + 5 | White | UHMWPE + 7 | White |
| 4j | Yellow | | |
| 6j | Black | | |
| Kevlar + 5 | Beige | | |

EXAMPLE 10

Binding of Hydrogen Peroxide to Functionalised Polymers (9a-s, 10)

To a flask containing hydrogen peroxide (50% aqueous solution, 10 ml) was added the functionalised polymer (4a-f or 8) and the mixture allowed to stand at room temperature in the dark for 16 h. The polymer was isolated by filtration and the solid washed with water (1-1.5 l) to yield the hydrogen peroxide adduct (Scheme 7).

Scheme 7

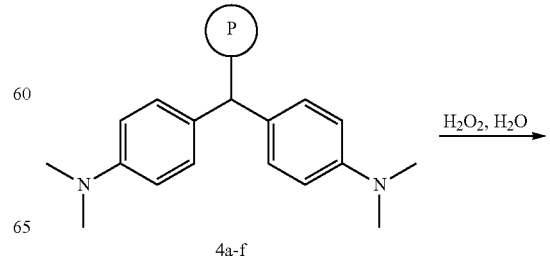

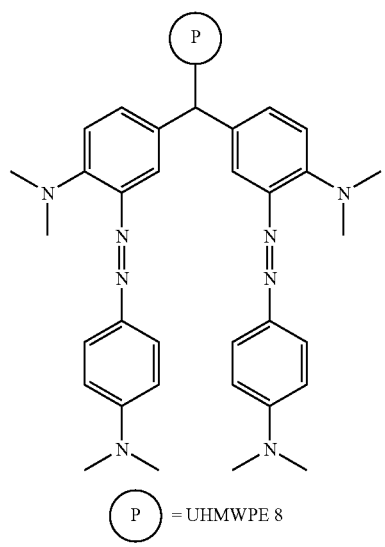

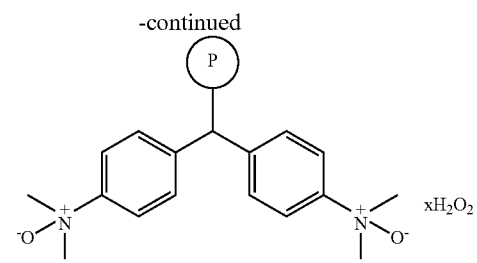

| P = | XAD-4 | 9a | Tencel | 9k |
|---|---|---|---|---|
| | PSXL-S | 9b | Viscose | 9l |
| | UHMWPE | 9c | NK-Cotton | 9m |
| | SMUHMWPE | 9d | MW-Cotton | 9n |
| | PE-S | 9e | Cotton Wool | 9o |
| | PP | 9f | PET | 9p |
| | PP-S | 9g | Silica Gel | 9q |
| | N-610 | 9h | Alumina | 9r |
| | Hybond-N | 9i | Nomex | 9s |
| | Kevlar | 9j | | |

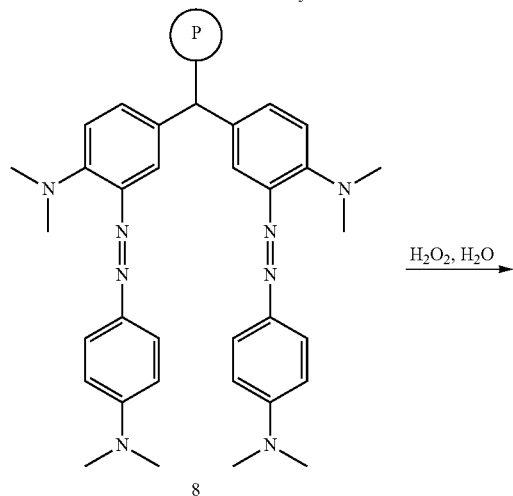

8

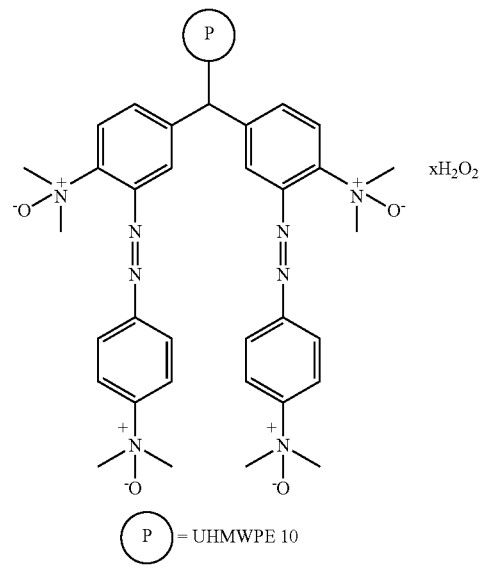

P = UHMWPE  10

Method for Determining Oxidant Loading

A sample of the required polymer was suspended in 50% aqueous hydrogen peroxide for 18 h. The polymer was filtered and washed with water, collected and treated with solution of 10% aqueous potassium iodide (0.1 M) in acetic acid After standing for 5 minutes a 1% aqueous starch solution was added and the suspension left to stand for 1 h. The resulting dark blue coloured solution was titrated with sodium thiosulfate until the colourless endpoint. The mixture was left for an hour and any further blue coloration of the solution was further titrated with sodium thiosulfate until no further colour persisted (Table 9).

TABLE 9

Hydrogen peroxide loading on functionalised polymers.

| Sample | Loading of oxidant/ mol $g^{-1}$ | Sample | Loading of oxidant/ mol $g^{-1}$ |
|---|---|---|---|
| 9a | $7.9 \times 10^{-4}$ | 9k | $2.7 \times 10^{-5}$ |
| XAD-4 | N/D | Tencel | N/D |
| 9b | $1.2 \times 10^{-4}$ | 9l | $1.7 \times 10^{-5}$ |
| PSXL-S | N/D | Viscose | N/D |
| 9c | $2.6 \times 10^{-4}$ | 9m | $2.5 \times 10^{-5}$ |
| UHMWPE | N/D | NK-Cotton | N/D |
| 9d | $8.9 \times 10^{-5}$ | 9n | $4.3 \times 10^{-6}$ |
| SMUHMWPE | N/D | MW-Cotton | N/D |
| 9e | $2.6 \times 10^{-5}$ | 9o | $3.2 \times 10^{-6}$ |
| PE-S | N/D | Cotton wool | N/D |
| 9f | $1.1 \times 10^{-5}$ | 9p | $4.3 \times 10^{-4}$ |
| PP | N/D | PET | N/D |
| 9g | $1.2 \times 10^{-6}$ | 9q | $2.4 \times 10^{-6}$ |
| PP-S | N/D | Silica | N/D |
| 9h | $1.5 \times 10^{-4}$ | 9r | $5.9 \times 10^{-6}$ |
| N-610 | N/D | Alumina | N/D |
| 9i | $6.6 \times 10^{-5}$ | 9s | $2.3 \times 10^{-4}$ |
| Hybond-N | N/D | Nomex | N/D |
| 9j | $5.3 \times 10^{-5}$ | 10 | $2.3 \times 10^{-4}$ |
| Kevlar | N/D | UHMWPE | N/D |

N/D = Not detected.

EXAMPLE 11

Biotesting

Method for Biotesting

An agar plate inoculated with the *S. Aureus* was punched with 10 mm wells. To these wells was added 20 μl of molten agar. When set the polymer sample was added to the well so that an even thin layer of polymer was produced. The well was then sealed with a further 50 μl of molten agar, the plate incubated overnight at 37° C. and the zones measured after this (Table 10).

Bioassay Results *S. Aureus*.

TABLE 10

Zone of inhibition results against *S. Aureus* using 10 mm wells.

| Sample | Weight of polymer/g | Zone/mm |
|---|---|---|
| 4a | 0.087 | N/D |
| 9a | 0.090 | 38 |
| XAD-4 + $H_2O_2$ | 0.091 | N/D |
| 4c | 0.089 | N/D |
| 9c | 0.075 | 37 |
| UHMWPE + $H_2O_2$ | 0.090 | N/D |
| 4f | 0.090 | N/D |
| 9f | 0.080 | 22 |
| PP + $H_2O_2$ | 0.090 | N/D |
| 4q | 0.091 | N/D |
| 9q | 0.071 | N/D |
| Silica + $H_2O_2$ | 0.090 | N/D |

N/D = Not detected.

The invention claimed is:

1. A process for producing a substrate having a functionalised surface, which process comprises:
    (a) contacting the substrate with a carbene precursor, which carbene precursor is selected from a compound of the following formula (III):

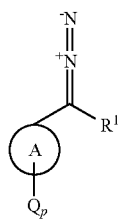

wherein
    A is an aryl or heteroaryl ring;
    p is 1, 2, 3, 4 or 5;
    $R^1$ is selected from hydrogen, aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by $N(R^2)$, O or S wherein $R^2$ is H or $C_1$-$C_6$ alkyl;
    Q is selected from —N($Z_1$)($Z_2$) and —$CH_2$—V—(W—R)$_n$;
    $Z_1$ and $Z_2$ are independently selected from aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by $N(R^2)$, O or S wherein $R^2$ is H or $C_1$-$C_6$ alkyl;
    V is -alk, —O-alk-, -alk-O— or -Oalk-O—, wherein alk is $C_1$-$C_{10}$ alkylene;
    W is a functional group of one of the following formulae (a) to (c):

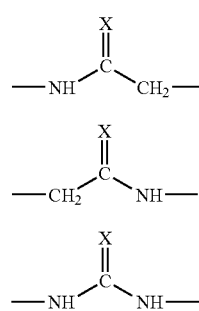

wherein X is O, S or $NH_2^+$; and
    R is selected from H, $C_1$-$C_6$ alkyl which is unsubstituted or substituted, aryl which is unsubstituted or substituted and heteroaryl which is unsubstituted or substituted; and n is 1, 2 or 3;

and a compound of the following formula (IV):

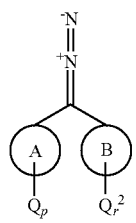

wherein each of A and B, which are the same or different, is an aryl or heteroaryl ring;
    each of Q and $Q^2$, which are the same or different, is —N($Z_1$)($Z_2$) or
    —$CH_2$—V—(W—R)$_n$, wherein $Z_1$, $Z_2$, V, W, R and n are as defined above for formula (III); and
    each of p and r, which are the same or different, is 1, 2, 3, 4 or 5;
    (b) generating a carbene reactive intermediate from the carbene precursor so that it reacts with the substrate to functionalise the surface, thereby yielding an activated substrate; and
    (c) further functionalising the activated substrate obtained in (b).

2. A process according to claim 1 wherein step (c) comprises treating the activated substrate obtained in step (b) with hydrogen peroxide, to yield a biocidal substrate.

3. A process according to claim 1 wherein step (c) comprises treating the activated substrate obtained in step (b) with a diazonium salt, thereby forming a diazo coupled coloured substrate.

4. A process according to claim 3 wherein the diazonium salt is $ArNa^+$, wherein Ar is selected from aryl which is unsubstituted or substituted and heteroaryl which is unsubstituted or substituted.

5. A process according to claim 1 wherein step (c) comprises treating the activated substrate obtained in step (b) with a functionalised diazonium salt, thereby forming a diazo coupled substrate wherein the functionality of the diazonium salt confers a desired activity on the diazo coupled substrate.

6. A process according to claim 3, which process further comprises: treating the diazo coupled substrate obtained in step (c) with hydrogen peroxide, to yield a biocidal diazo coupled substrate.

7. A process according to claim 1, wherein the substrate comprises a polymer.

8. A process according to claim 1, wherein the substrate comprises an inorganic material.

9. A process according to claim 1, wherein the substrate comprises a mixture of a polymer and an inorganic filler.

10. A process according to claim 7, wherein the polymer is a homopolymer or a copolymer.

11. A process according to claim 7, wherein the polymer is selected from polyolefins, polyesters, polyamides, polystyrenics, polytetrafluoroethylene, polyglycosides, polypeptides, polyacrylates, polyacrylics, polycarbonates, polyethers, polyketones, rubbers, polysulfones, polyurethanes, polyvinyls, cellulose and block copolymers.

12. A process according to claim 8, wherein the inorganic material is selected from silica, alumina, titania, glass and an allotrope of carbon.

13. A process according to claim 1, wherein the carbene precursor is selected from bis-4,4'-N,N-dimethylammo diphenyldiazomethane and 1-{2-[4-(diazo-phenyl-methyl)-benzyloxy]-ethyl}-3-phenyl urea.

14. A substrate which is obtainable by a process as defined in claim 1.

15. A biocidal polymeric substrate which is obtainable by a process as defined in claim 2.

16. A water purification system, a water filtration system, an air purification system, an item of clothing, an item of surgical equipment or a medical device which incorporates a biocidal polymeric substrate as defined in claim 15.

17. A coloured substrate which is obtainable by a process as defined in claim 3.

18. An item of packaging, a lens or a security tag which incorporates a coloured substrate as defined in claim 17.

19. A compound of formula (I):

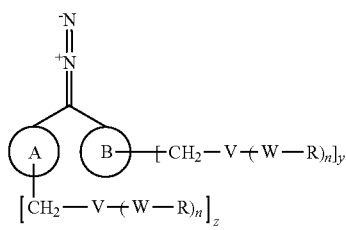
(I)

wherein each of A and B, which are the same or different, is an aryl or heteroaryl ring; n is an integer of 1 to 3;

y is 0 or an integer of 1 to 5;

z is 0 or an integer of 1 to 5;

provided that z and y are not both 0;

V is -alk, —O-alk-, -alk-O— or —O-alk-O—, wherein alk is $C_1$-$C_{10}$ alkylene;

W is a functional group of one of the following formulae (a) to (c):

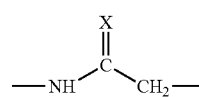
(a)

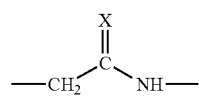
(b)

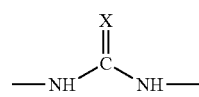
(c)

wherein X is O, S or $NH_2^+$; and

R is selected from H, $C_1$-$C_6$ alkyl which is unsubstituted or substituted, aryl which is unsubstituted or substituted, and heteroaryl which is unsubstituted or substituted;

provided that the compound is not 4,4'-bis(N-acetyl-2-aminoethyl)diphenyldiazomethane.

20. A compound according to claim 19 which is of the following formula (Ia):

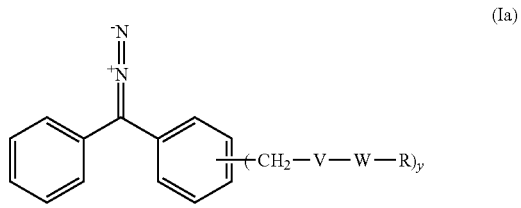
(Ia)

wherein y is an integer of 1 to 5 and each of V, W and R is as defined in claim 19.

21. A compound according to claim 19 wherein y is 1.

22. A compound according to claim 19 which is of the following formula (Ib):

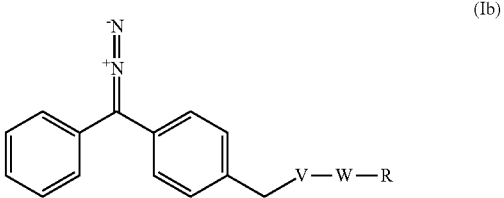
(Ib)

wherein each of V, W and R is as defined in claim 19.

23. A process for producing a compound of formula (VII) or (VIII):

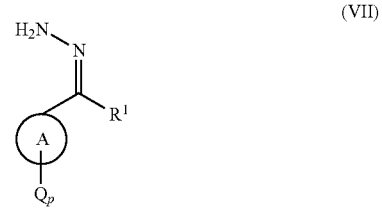
(VII)

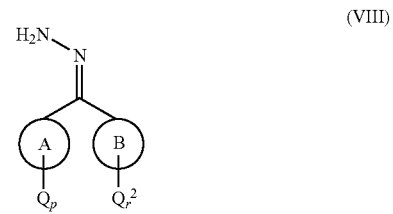
(VIII)

wherein A is an aryl or heteroaryl ring;

B is an aryl or heteroaryl ring; p is 1, 2, 3, 4 or 5; r is 1, 2, 3, 4 or 5;

$R^1$ is selected from hydrogen, aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by $N(R^2)$, O or S wherein $R^2$ is H or $C_1$-$C_6$ alkyl;

$Q^2$, which may be the same as or different from Q, is —$N(Z_1)(Z_2)$; and $Z_1$ and $Z_2$ are independently selected from aryl which is unsubstituted or substituted, heteroaryl which is unsubstituted or substituted, $C_1$-$C_{10}$ alkoxy which is substituted or unsubstituted, $C_1$-$C_{10}$ alkylamino which is substituted or unsubstituted, di($C_1$-$C_{10}$)alkylamino which is substituted or unsubstituted, $C_1$-$C_{10}$ alkylthio which is substituted or unsubstituted, and $C_1$-$C_{10}$ alkyl which is unsubstituted or substituted and which is optionally interrupted by N(R), O or S wherein R is H or $C_1$-$C_6$ alkyl; the process comprising treating a compound of formula (V) or (VI) with hydrazine in the presence of heat and a solvent:

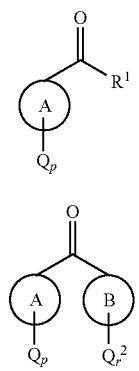

(V)

(VI)

wherein A, B, Q, $Q^2$, p, r and $R^1$ are as defined above.

24. A process according to claim 23, which process further comprises oxidising a compound of formula (VII) or (VIII) to produce a carbene precursor compound of formula (III) or (IV) respectively:

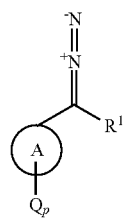

(III)

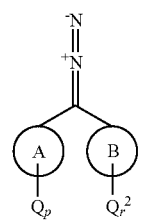

(IV)

wherein A, B, Q, $Q^2$, p, r and $R^1$ are as defined in claim 23.

* * * * *